(12) United States Patent
Nordquist

(10) Patent No.: US 6,983,911 B1
(45) Date of Patent: Jan. 10, 2006

(54) AVIATION TIRE

(76) Inventor: Thomas D. Nordquist, 45439 Metz Rd., Columbiana, OH (US) 44408

(*) Notice: Subject to any disclaimer, the term of this patent is extended or adjusted under 35 U.S.C. 154(b) by 29 days.

(21) Appl. No.: 10/696,925

(22) Filed: Oct. 30, 2003

(51) Int. Cl.
*B64C 25/32* (2006.01)

(52) U.S. Cl. .................. 244/103 S; 152/523; D12/605

(58) Field of Classification Search ............ 244/103 S; 152/523; D12/152, 134, 138, 605
See application file for complete search history.

(56) References Cited

U.S. PATENT DOCUMENTS

| | | | | |
|---|---|---|---|---|
| 2,457,899 A | * | 1/1949 | Hursh | 244/103 S |
| 3,741,503 A | * | 6/1973 | Cabeza | 244/103 S |
| 3,773,283 A | * | 11/1973 | Abplanalp | 244/103 S |
| 4,615,498 A | * | 10/1986 | Ochiai | 244/103 S |
| 5,213,285 A | * | 5/1993 | Stanko | 244/103 S |
| 5,259,431 A | * | 11/1993 | Housiaux | 152/523 |

* cited by examiner

*Primary Examiner*—J. Woodrow Eldred
(74) *Attorney, Agent, or Firm*—Renner, Kenner, Greive, Bobak, Taylor & Weber

(57) ABSTRACT

An aviation tire including, a pair of side walls, the side walls having an outer surface, a tread portion spanning a radial outer extremity of the side walls, and a rotating assembly formed on the side wall or the tread portion, the rotating assembly having an increased resistance to wind when located at a lowermost portion of the tire.

7 Claims, 2 Drawing Sheets

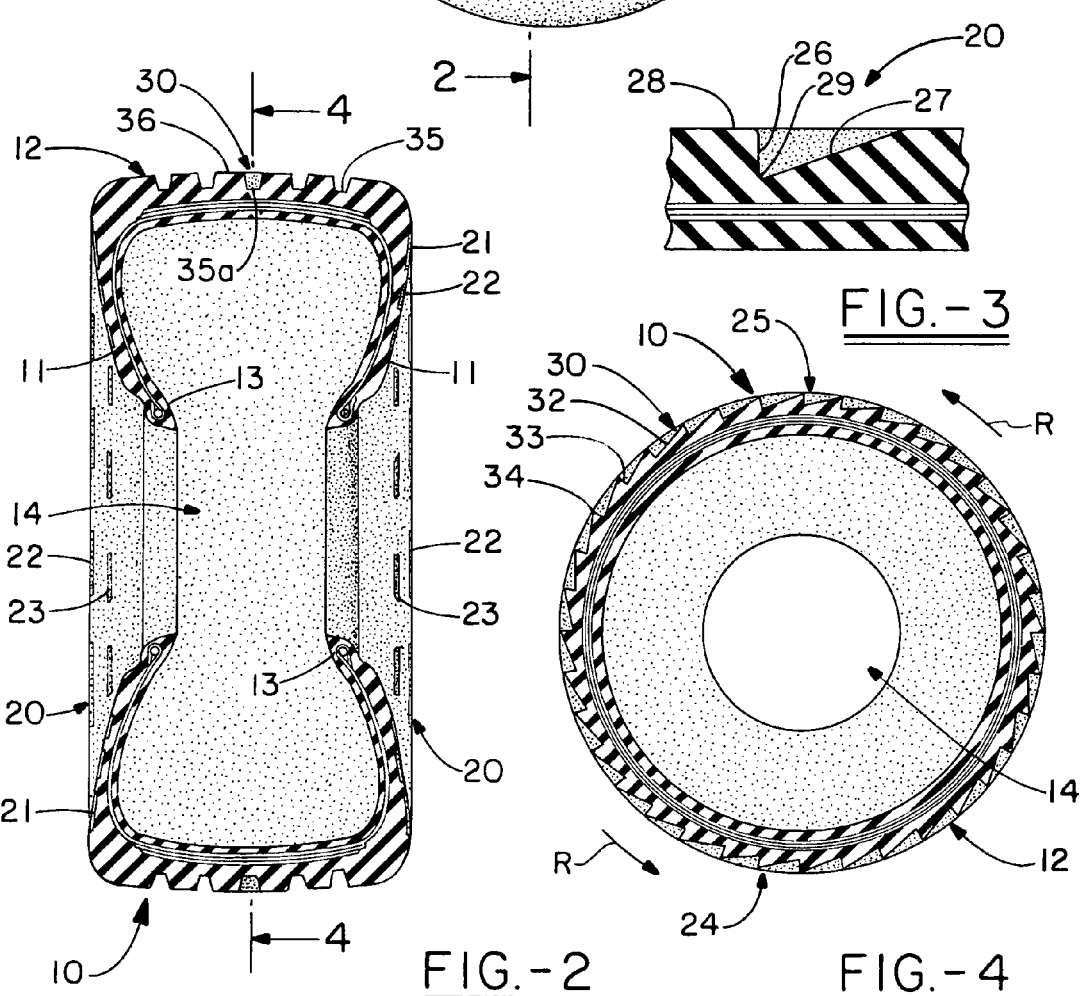

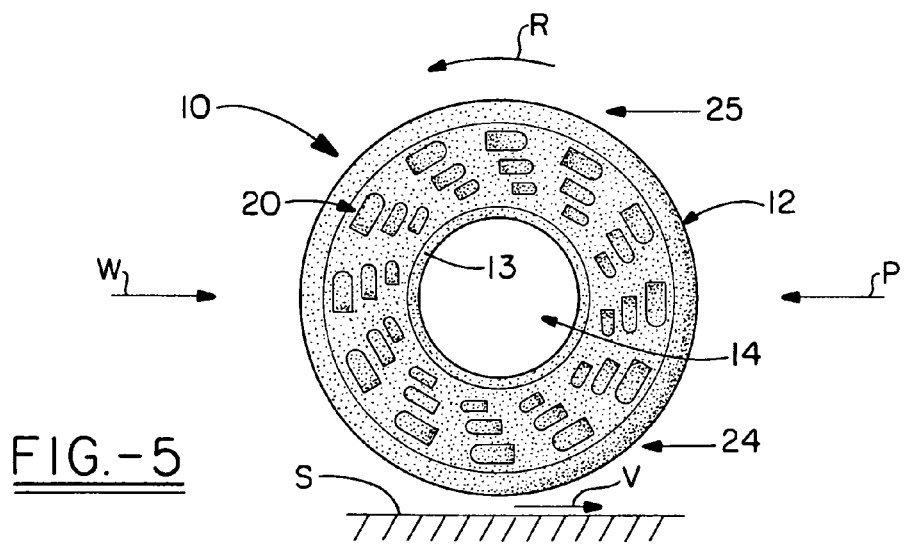
FIG.-5
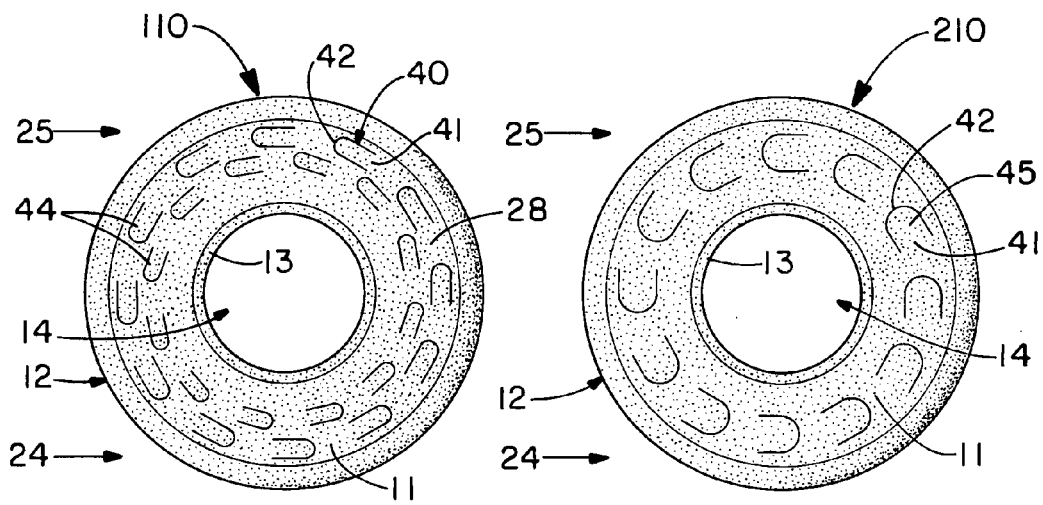
FIG.-6          FIG.-8
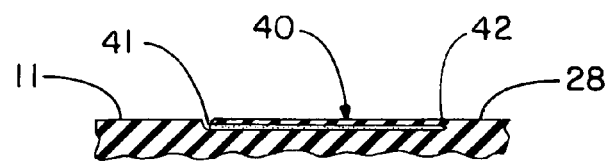
FIG.-7
FIG.-7A

AVIATION TIRE

TECHNICAL FIELD

The present invention relates to tires. More particularly, the present invention relates to a tire used in connection with aircraft landing gear. Most particularly, the present invention relates to an aviation tire that is adapted to rotate in the direction of the flight of the aircraft to reduce frictional forces at touchdown of the tires.

BACKGROUND OF THE INVENTION

As is well known, planes typically travel at significant speeds at the point of landing. To accommodate these speeds, wheels are provided on the aircraft landing gear such that the aircraft continues to move after the plane lands on the runway. Braking forces may then be applied either to the wheels or by means of jet reversers to bring the plane to a stop.

Considering the wheels in more detail, when in flight, the wheels are in a moving reference frame. In particular, the wheels have a velocity equal to the velocity of the plane just prior to impact relative to the surface on which the plane is landing. The typically large difference between the velocity of the wheel and velocity of the surface on which the plane is landing generates significant frictional forces between the surface of the wheel's tire and the landing surface. Initially the velocity of the tire relative to the landing surface is great enough to overcome the sliding friction between the tire and the landing surface. This causes the tire to slide until the tire has decelerated sufficiently for rolling frictional forces to take over. This initial sliding is evident from an audible chirp or screech made as the plane touches down. During the sliding phase, as the tire is essentially dragged across the landing surface, the landing surface abrades the tire at the contact patch leading to a flat spot on the tire. As will be appreciated such "flat spotting" of the tire makes the tire out of round decreasing its performance during the rolling phase. Repeated flatspotting greatly shortens the useful life of the tire.

As will be appreciated, the significant downforce of the plane exacerbates the wear of the tire. As a result, the frictional forces coupled with the downward force of the plane results in a great amount of wear and tear on the tire. This wear requires frequent replacement of the tires and increases the amount of downtime for the plane.

SUMMARY OF THE INVENTION

In light of the forgoing, it is an object of the present invention to reduce aviation tire wear.

It is an object of the present invention to provide a tire adapted to rotate in the direction of the flight of the aircraft, on which it is mounted, to reduce the frictional forces that occur upon impact of the tire on a landing surface.

In light of at least one of the foregoing objects, the present invention generally provides an aviation tire including, a pair of side walls, the side walls having an outer surface, a tread portion spanning a radial outer extremity of the side walls, and a rotating assembly formed on said side wall or said tread portion, said rotating assembly having an increased resistance to wind when located at a lowermost portion of the tire.

The present invention further provides an aviation tire including a pair of side walls having an outer surface, a tread portion spanning a radial ladder extremity of the side walls, and a rotating assembly formed on the side wall or the tread portion. The rotating assembly having a leading wall and a trailing wall, where the leading wall faces rearward at an upper most portion of the tire and faces forward in a lower most portion of the tire, the leading wall having an increased resistance to wind relative to the trailing wall.

BRIEF DESCRIPTION OF THE DRAWINGS

For a complete understanding of the objects, techniques and structure of the invention, reference should be made to the following detailed description and accompanying drawings wherein:

FIG. 1 is a side elevational view of a tire according to the concepts of the present invention;

FIG. 2 is a sectional view of a tire according to the concepts of the present invention as might be seen along line 2—2 in FIG. 1;

FIG. 3 is an enlarged radial sectional view as might be seen along line 3—3 in FIG. 1 depicting details of indents formed in the side wall of the tire of the present invention;

FIG. 4 is an enlarged side sectional view as might be seen along line 4—4 in FIG. 2 depicting details of a ridge within the tread of the tire according to the concepts of the present invention;

FIG. 5 is a partially schematic view of a tire according to the concepts of the present invention depicting rotation of the tire relative to the wind direction and plane direction;

FIG. 6 is a side elevation view of a first alternative embodiment of the present invention having inflatable pockets located on the side wall of the tire;

FIG. 7 is a schematic top view of an inflatable pocket formed on the aviation tire according to the concepts of the present invention shown in a deflated condition and an inflated condition;

FIG. 7A is a schematic top view of an inflatable pocket formed on the aviation tire similar to that shown in FIG. 7, where the pocket is shown at a position at the lower most portion of the tire with the pocket in an inflated condition; and FIG. 8 is a second alternative embodiment of a tire according to the concepts of the present invention having a single row of large inflatable pockets.

DETAILED DESCRIPTION OF THE INVENTION

A tire according to the concepts of the present invention is generally indicated by the numeral 10 in the accompanying drawings. Tire 10 includes sidewalls 11 and a tread portion, generally indicated by the numeral 12, that spans the sidewalls 11 at the radial outer extremity of the tire 10. A bead ring 13 is formed on the radial inner extremity of the tire 10 and defines a central opening 14 in which a rim (not shown) is received. To this extent, the tire 10 is of a conventional construction and may be manufactured according to methods known in the art.

As best shown in FIG. 5, when the tire 10 is in flight it travels in the direction of the plane, as indicated by the arrow P, and faces wind flow, generated by the movement of the plane, generally opposite the plane direction P and indicated by the wind direction arrow W. To reduce the relative velocity between the tire 10 and the landing surface S at impact, it is desirable to cause the tire 10 to rotate forwardly relative to the direction of the plane P. To accomplish this, the sidewalls 11 may be provided with one or more rotating assemblies, such as, indents, generally indicated by the numeral 20. In general, the rotating assemblies, such as indents 20, are adapted to provide the greatest resistance to the wind W at the lowermost portion 24 of tire 10 to cause tire rotation. It will be appreciated that only a single sidewall 11 may be provided with indents 20, but it is believed preferable to have symmetrically located indents 20 on both sidewalls 11 of the tire 10 or balancing purposes. As shown in FIGS. 1 and 5, indents 20 may be arranged in radially spaced rows 21, 22, 23. Indents 20 in rows 21, 22, 23 may be circumferentially offset relative to an adjacent indent 20 in an adjacent row. For example, as shown in FIG. 1, the indent 20 in an intermediate row 22 may be circumferentially spaced behind, relative to the direction of rotation R (FIG. 5), the indent 20 in the outer most row 21. Similarly, the innermost row 23 may have indents 20 circumferentially spaced behind those of adjacent intermediate rows 22. As is further shown in FIG. 1, the size of the indents 20 may vary in terms of radial location. In the example shown in FIG. 1, the indent's size decreases as one travels radially inward on the sidewall 11 of the tire 10. In other words, the largest indents 20 are located at the radially outer extremity of the tire 10 and the smallest indent are located at the radial inner extremity of the sidewall 11.

One example of a possible structure for an indent 20 is shown in FIG. 3. Generally, indent 20 is shaped to catch the wind W or increase drag as it approaches the lowermost portion 24 of the tire 10 and create the least resistance to the wind W at the uppermost portion 25 of the tire 10. To that end, indent 20 has a leading edge 26 that is recessed from the outer surface 28 of the sidewall 11. At the uppermost portion 25, this surface 26 is essentially hidden from the wind W. As the indent 20 reaches the lowermost portion 24 of the tire 10, however, the trailing wall 27, which is less resistant to the wind W in the uppermost position 25, allows wind W to contact leading wall 26 imparting rotation to the tire 10. In the example shown in FIG. 3, the leading wall 26 extends radially outward and is generally square to the direction of the wind W when in the lowermost position 24. The trailing wall 27 slopes inwardly from the outer surface 28 of the sidewall 11. Joining the leading wall 26 at a vertex 29.

In the alternative or in addition to the indents 20, the rotating assemblies may include ridges, generally indicated by the numeral 30 in FIG. 4, may be provided in the tread portion 12 of the tire 10. Ridges 30 extend radially outward from the inner surface 31 of tread portion 12. As best shown in FIG. 4, ridge 30 has a leading wall 32 and trailing wall 33 that join at a vertex 34. Leading wall 32 is shaped such that it creates less drag than the trailing wall 33, such that, the trailing wall 33, when located at the lowermost portion 24, of tire 10, creates relatively increased drag allowing the wind W to impart rotation to the tire 10. It will be appreciated that a number of face shapes may be used in accordance with the concept of reducing drag on the uppermost portion 25 of the tire 10 and increasing drag on the lowermost portion 24 of the tire 10 to impart rotation in the direction of the plane P. In the example shown, the leading wall 32 extends at an incline relative to the surface 31 of the tread portion 12 and the trailing wall 33 extends radially outward in a direction generally perpendicular to the face 31 of the tire 10. In the example shown, ridges 30 are arranged consecutively about the circumference of tire 10 in a sawtooth pattern. It will be appreciated that ridges 30 may be spaced from each other about the circumference of tire 10.

As shown in FIG. 4, the ridges 30 may reside completely within the circumferential plane defined by the tread surface 12. Ridges 30 may reside within grooves 35 in the tire's tread portion 12 or form part of a tread element 36. In the example shown, ridges 30 may be formed in a central groove 35A of tire 10 to apply a force along the center line of tire 10. It will be appreciated that ridges 30 may be formed in other grooves 35 or be part of the tread element 36 as mentioned above. Since ridges 30 may be formed as part of tread 12 without reducing the thickness of tire 10, ridges 30 may be desirable in terms of tire strength. Like indents 20, ridges 30 are adapted to have an increased wind resistance at a lowermost portion 24 of the tire 10 relative to the wind direction W and reduced resistance at the uppermost portion 25 to impart rotation R to the tire 10 in the direction of the plane's path P. In these examples, the leading wall provides the increased resistance. This rotation R reduces the speed differential between the tire 10 and landing surface S because, as best shown in FIGS. 4 and 5, the rotating tire 10 has a velocity (R) in the same direction as the landing surface velocity V.

An alternative tire according to the present invention is generally indicated by the numeral 110 and is shown in FIGS. 6–8. Since forming indentations in the sidewall 11 of the tire may create a concern as to the sidewall strength, pockets, generally indicated by the numeral 40 may be formed or attached on the exterior surface 28 of the sidewall 11. As is shown in FIG. 6, pockets 40 have an open end 41 located downstream of the leading edge 42 of the pocket 40. In the uppermost portion 25, the pocket 40 is collapsed (FIG. 7) by the force of the wind W flowing over the closed end 42 of the pocket 40. At the lowermost portion 24 (FIG. 7A), however, the open end 41 of the pocket is exposed to the wind W and the pocket 40 is filled with air allowing the wind W to impart forward rotation of the tire 10. As will be appreciated, the pockets 40 may be applied or attached to the outer surface 28 of sidewall 11 or an integral pocket 40' (FIG. 7A) may be formed on the sidewall 11.

As shown in FIG. 6, the pockets may be arranged in multiple rows 44 as described in the previous embodiment. Alternatively, as shown in a second alternate embodiment, generally indicated by the numeral 210 in FIG. 8, a single row of enlarged pockets 45 may be used.

In operation, the increased resistance of the indentations 20, ridges 30, or pockets 40, 45 at the lower portion 24 of the tire 10 allows the wind W to impart a forward rotation R to the tire 10, such that, a relative velocity V between the tire 10 and the surface S on which the plane is landing is reduced resulting in decreased frictional wear on the tire 10. An attendant result of the decrease in wear on the tire 10 would be less frequent changing of the tires 10 and less downtime for the aircraft. In this way, a cost savings in terms of tire replacement is achieved and an increase in the working time of the aircraft is achieved, which may result in the use of fewer planes to transport the same number of passengers or cargo or the ability to transport a greater number of passengers and cargo with the same number of planes.

In light of the foregoing, it should thus be evident that the aviation tire of the present invention, substantially improves the art. While, in accordance with the patent statutes, only the preferred embodiments of the present invention have been described in detail hereinabove, the present invention is not to be limited thereto or thereby. Rather, the scope of the invention shall include all modifications and variations that fall within the scope of the attached claims.

What is claimed is:

1. An aviation tire comprising:
   a pair of side walls, said side walls having an outer surface;
   a tread portion spanning a radial outer extremity of said side walls; and
   a rotating assembly formed on said side wall, said rotating assembly having an increased resistance to wind when located at a lowermost portion of the tire;
   wherein said rotating assembly includes a leading wall and a trailing wall, wherein said leading wall faces rearward at an upper most portion of the tire and faces forward at a lowermost portion of the tire, said leading wall having an increased resistance to wind relative to said trailing wall; and
   wherein said rotating assembly is formed on said side wall and wherein said leading wall and said trailing wall are recessed from said outer surface of said tire to from an indent on said side wall, wherein said leading wall and said trailing wall are fixed relative to the surface of the sidewall and said indent remains open to the atmosphere throughout rotation of the tire.

2. The aviation tire of claim 1, wherein said leading wall extends substantially perpendicular to an outer surface of the tire.

3. The aviation tire of claim 1, wherein said trailing wall connects to said leading wall at a vertex and extends from said vertex to said outer surface of the tire, wherein said trailing wall is longer than said leading wall.

4. An aviation tire comprising:
   a pair of side walls, said side walls having an outer surface;
   a tread portion spanning a radial outer extremity of said side walls; and
   a rotating assembly formed on said side wall, said rotating assembly having an increased resistance to wind when located at a lowermost portion of the tire;
   wherein said rotating assembly includes a leading wall and a trailing wall, wherein said leading wall faces rearward at an upper most portion of the tire and faces forward at a lowermost portion of the tire, said leading wall having an increased resistance to wind relative to said trailing wall; and
   wherein said rotating assembly is formed on said side wall and wherein said leading wall and said trailing wall are recessed from said outer surface of said tire to from an indent on said side wall;
   wherein plural rotating assemblies are formed on said side walls in plural circumferential rows, wherein indents within a row are of increasingly smaller dimension relative to a radially outward located row of indents.

5. An aviation tire comprising:
   a pair of side walls, said side walls having an outer surface;
   a tread portion spanning a radial outer extremity of said side walls;
   and a rotating assembly formed on said side wall, said rotating assembly having an increased resistance to wind when located at a lower most portion of the tire;
   wherein said rotating assembly includes a leading wall that extends axially inward from said outer surface of said side wall and substantially perpendicular thereto, said leading wall facing rearward relative to the wind's direction at an upper most portion of the tire and faces forward at a lower most portion of the tire to catch the wind at said lower most portion, said rotating assembly further including a trailing wall that extends outward from an axial inward extremity of said leading wall forming a vertex where said leading wall and trailing wall connect, said trailing wall extending axially outward at an incline from said vertex to said outer surface of said side wall.

6. The aviation tire of claim 5, wherein said leading wall and trailing wall define a triangular cross-sectioned recess.

7. The aviation tire of claim 5, wherein said trailing wall extends outwardly from said leading wall to a greater extent than said leading wall extends inwardly from said outer surface of said side wall.

* * * * *